United States Patent Office 3,403,966
Patented Oct. 1, 1968

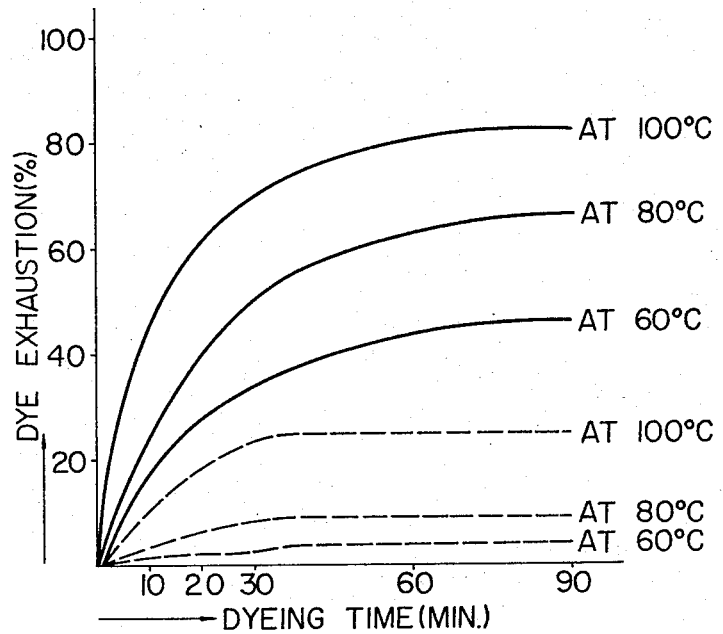

3,403,966
DYEING METAL-MODIFIED POLYOLEFINS WITH
O' - (ALKYL- AND ARYLAMINOCARBONYL-)
AND O'-CYANOAZOPYRAZOLONE DYES
Shinya Itoh, Kyoto, Katsuo Kanno, Ohtsu-shi, Kazue
Wakamatsu, Nishinomiya-shi, and Ryoichi Nakagawa,
Fuse-shi, Osaka-fu, Japan, assignors to Toyo Rayon
Kabushiki Kaisha, Tokyo, Japan, a corporation of Japan
Filed Mar. 2, 1965, Ser. No. 436,507
Claims priority, application Japan, Mar. 11, 1964,
39/13,425
4 Claims. (Cl. 8—4)

ABSTRACT OF THE DISCLOSURE

A process for coloring a shaped polyolefinic article containing a transition metal compound wherein said shaped article is deeply dyed with a mono-azo dyestuff obtained by coupling a diazotised aromatic amine having cyano or an N,N-disubstituted carbonamido in the ortho-position to the amino group with a pyrazolone coupler.

---

This invention relates to a process for colouring a polyolefinic shaped article containing a metal compound with the use of a specified dyestuff which can give the brightness of shade and fastness characteristics.

Generally speaking, the polymers of olefines such as ethylene and propylene substantially lack in dyestuff binding groups. Therefore, they exhibit a very small degree of affinity for dyestuffs or pigments which are usually used for colouring natural or synthetic substances. Though having temporary affinity for a polyolefinic shaped article, these dyestuffs tend to bleed out. It has been difficult in practice to obtain the dyeings of a polyolefine shaped article which exhibit excellent fastness to light, washing, dry cleaning, sublimation and rubbing.

It has hitherto been proposed with a purpose of overcoming these difficulties to incorporate as a dyestuff binding agent a certain class of metal compound in a polyolefinic resin and to dye the shaped article which is obtained by melt spinning this blend. For instance, the specification of U.S. Patent No. 2,984,634 proposes a process which comprises incorporating a metal compound, being a 6 to 12 carbon atom carboxylic acid salt of nickel, chromium, cobalt, aluminium, titanium and zirconium into a crystalline polymerized α-monoolefinic hydrocarbon in an amount of 0.1 to 2% by weight calculated as metal, shaping the blend and thereafter colouring the shaped article by means of an anthraquinonic dyestuff. However, the use of this anthraquinonic dyestuff does not give rise to fully satisfactory colourings. Also, Japanese Patent Publication No. 4,477/1963 describes a process which comprises colouring an article of poly-α-olefine wherein there is incorporated a basic or anionic exchange substance containing the metal of Group 2a, 2b or 4a of the Periodic Table by using a dyestuff having a slightly ionizable acidic group and thereby forming a salt or chelate of the dyestuff and the metal. However, the process shown in this publication does not impart satisfactory fastness to light, washing, drycleaning and rubbing. Some of the named dyestuffs never bring about commercially allowable dyeings. Elsewhere, Belgian Patents Nos. 632,652 and 632,653 propose a method of colouring the Werner-complex-forming metal containing polymer of ethylene or propylene by means of a monoazo dyestuff containing a group capable of forming a metal chelate with its metal. Some of the dyestuffs disclosed specifically in these Belgian patents develop a deep colour in a polyolefinic shaped article containing a metal compound. However, such problems as the brightness of shade and level dyeing are still unsolved.

Accordingly, one of the objects of this invention is to present a process for dyeing a polyolefinic shaped article containing a metal compound in a brilliant shade, not in an indistinct shade peculiar with a metal-complex dyestuff. Another object of this invention is to provide a process for dyeing a polyolefinic shaped article containing a metal compound so that the dyeings may have an excellent fastness to light, dry cleaning, washing, rubbing and sublimation. Still another object of this invention is to provide a dyeing method by which a metal compound containing polyolefinic shaped article can be dyed in deep or middle colour as the case may be. The other objects and advantages of this invention will become apparent from the following descriptions.

In accordance with this invention the afore-mentioned objects and advantages can be achieved by a process for dyeing a polyolefinic shaped article containing a transition metal compound which comprises colouring an article of polyolefine obtained by melt-shaping a polyolefinic resin wherein there is incorporated at least 0.01% by weight of a transition metal compound calculated as the metal by using an insoluble monoazo dyestuff of the formula:

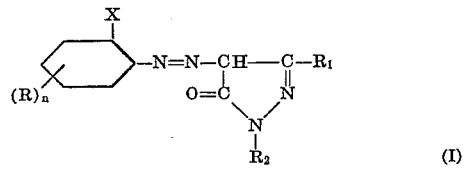

(I)

In the Formula I X represents —SR₃,

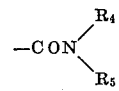

or —CN;
wherein $R_3$ stands for an alkyl having up to 18 carbon atoms, or an aryl having 6 to 10 carbon atoms; $R_4$ and $R_5$ are the same or different, each representing an alkyl of 1 to 6 carbon atoms or a phenyl; $R_1$ represents a hydrogen atom, an alkyl of up to 6 carbon atoms or an alkoxycarbonyl of up to 6 carbon atoms; $R_2$ represents a hydrogen atom, an alkyl having up to 6 carbon atoms or an aryl having 6 to 10 carbon atoms; R represents a non-solubilizing member selected from the group consisting of a hydrogen atom, a halogen atom, an alkyl having up to 6 carbon atoms, an alkoxy having up to 6 carbon atoms and a cyano; $n$ means 1, 2 or 3; and $R_1$, $R_2$, $R_3$, $R_4$ and $R_5$ may contain one or more non-solubilizing groups.

The monoazo dyestuff of the above Formula I can be produced in accordance with the known process. It can be produced by coupling diazotized 2-substituted mercapto-, 2-(N,N-di-substituted aminocarbonyl) or 2-cyano-aniline of the formula:

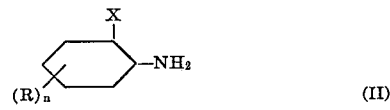

(II)

wherein X, R and $n$ are as hereinabove defined, with a pyrazolone of the formula:

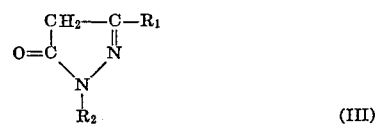

(III)

(wherein $R_1$ and $R_2$ are hereinabove defined) at the 4-position of the pyrazolone ring in accordance with the conventional method.

R on the benzene nucleus of the diazo component (II) may be hydrogen, but it may also be a non-solubilizing substituent such as cyano, halogen, lower alkyl or lower alkoxy.

The substituent X may be alkylmercapto such as methyl-, ethyl-, n-butyl-, dodecyl- and cyclohexyl-mercapto, or phenyl mercapto. These alkyls and phenyl may further contain non-solubilizing substituents. For instance, when the diazo components of the Formula II wherein X is p-methylphenyl mercapto are coupled with the coupling components of the Formula III, it gives very pleasing dyestuffs. The substituent X may be N,N-di-substituted aminocarbonyl wherein each of the two substituents on the nitrogen atom may be a lower alkyl or phenyl. The lower alkyl or phenyl may further contain a non-solubilizing substituent. For instance, the substituent X may be N-methyl-N-(4-chlorophenyl) aminocarbonyl, $R_4$ and $R_5$ when taken together may form 5 or 6-membered hetero cyclic ring with the nitrogen atom of the carboxylic amide, such as piperidino, pyrrolidino or morpholino.

$R_1$ and $R_2$ are as already defined hereinabove, but they may further contain a non-solubilizing substituent. For instance, $R_2$ can be hydrogen, a lower alkyl or phenyl; it can also be a lower alkyl or phenyl having a non-solubilizing substituent such as cyanoethyl, p-chlorophenyl, o-chlorophenyl, p-methylphenyl, o-chlorophenyl, p-ethoxyphenyl or o-methoxyphenyl.

As preferable coupling components of the Formula III, there can be exemplified 3-methylpyrazolone and 1-phenyl-3-methyl-pyrazolone.

As the polyolefinic resins to be used in this invention, there are homopolymers of α-olefines such as ethylene, propylene, 3-methyl-butene-1,4-methyl-pentene and 5-methyl-hexene-1, copolymers of two or more of these α-olefines, and graft-copolymers of these parent polymers grafted with other monomers. In these olefine polymers, other polymers such as polyesteramide, polyurine, polyurethane, epoxy resin or polycarbonate may be incorporated. Furthermore, the polyolefinic resins may contain a phenyl or amine type anti-oxidation agent, an ultraviolet ray absorbent such as benzophenone derivatives or triazine derivatives or fluorescent brightener, a delustering agent such as titanium oxide, a stabilizer such as alkali earth metal salt of fatty acid or organic phosphate or a dyeing auxiliary, or a plasticizer such as dioctylphthalate.

The metal compound to be incorporated in the polyolefinic resin in accordance with this invention is a dissociable compound of a transition metal. Nickel, zinc, copper, chrome and cobalt, especially nickel and zinc, are preferable metal components. As dissociable compounds of these metals, organic acid salts and organic complex compounds are preferable. In particular, higher carboxyl acid salts such as nickel stearate, nickel palmitate, nickel oleate, nickel naphthenate, zinc stearate, zinc oleate, zinc naphthenate, chrome stearate, cobalt stearate and copper naphthenate. Together with these higher carboxylic acids or in place of these, there can be used amino acid salts such as γ-amino acid nickel, salts of alkyl phosphate such as di-n-propyl-nickel-phosphate, n-hexyl-ethyl-nickel-phosphate, sulphonates such as dodecyl benzene-nickel-sulphonate and t-octylbenzene-chromium-sulphonate as well as benzoates, salicylates, salts of alkylphosphite, naphthionates, and salt of alkylsulphate. Furthermore, there are organic complex salts such as nickel acetylacetonate and zinc 8-hydroxy quinolinate, and weak chelate compounds such as metal chelate compounds of malonic acid ester derivatives and metal chelate compounds of acetoacetic acid derivatives. In a metal chelate compound, the substitution of chelate takes place between this compound and the dyestuff at the time of colouring; so it gives a relatively slow dyeing speed.

The transition metal compounds are incorporated in the polyolefinic resin in an amount of at least 0.01% by weight, and preferably 0.1–1% by weight calculated as metal based on the resin prior to melt-shaping.

Among the metal compounds to be incorporated in the polyolefinic resin in this invention, the metal compound of copper, silver or gold show a good coordination bond with the dyestuffs of this invention, but a defect is that when the melt temperature is high in the polyolefinic resin, they are easily changed into brown colour. When the metal compound of zinc, cadmium, mercury titanium, zirconium or hafnium is used, discolouration hardly takes place during the melt-shaping of the polyolefinic resin though the decomposition of the metal compound is more or less observable. However, it shows a little bit lower tendency to a coordination bond with the dyestuff of this invention. The metal compound of chrome, molybdenum, or tungsten is not discoloured by heat and is stable in the molten polymer. It shows a slight inferiority in the dyeing effect to be brought about by a coordination bond with the dyestuff of this invention, but exhibits excellent fastness properties. The metal compound of iron, cobalt or nickel gives good thermal stability in the molten polymer, a co-ordination bond with the dyestuff of this invention and fastness of colour; it gives rise to the most excellent effects. The use of a cobalt compound, however, involves some deterioration in the weatherability of the polymer. In consideration of the colour shade, brightness and fastness of the dyeings obtained by the dyestuffs of this invention, zinc, copper, chrome, and particularly nickel, are preferable as a metal component.

The polyolefinic resin in which a transition metal compound is incorporated can be melt-shaped, quenched and stretched in accordance with the known manner.

In the practice of the process covered by this invention, the said water-insoluble mono-azo dyestuff of the Formula I is dispersed in the water or solubilized with the aid of a dispersant or a solubilizing agent. As a dispersant or solubilizing agent, there are used optional anionic and non-ionic activators. However, when this dyestuff is used on dissolution in a polyoxyethylene nonionic surfactant wherein polyoxyethylene accounts for 60–85% instead of an ordinary anionic levelling agent or a very hydrophilic non-ionic levelling agent, this dyestuff permeates into the polyolefine shaped article homogeneously and excellently. It is especially preferable, therefore, to prepare the dyeing liquid by using this kind of dyestuff treating agent. A particularly good dyeing liquid is obtained by fusing the dyestuff with this kind of dyestuff treating agent, followed by dilution.

In this invention, optional dyeing methods such as a carrier dyeing method, a solubilization dyeing method, a high pressure high temperature dyeing method, and a thermosol dyeing method can be employed in carrying out the dyeing by using the said dyestuff (I). The amount of the dyestuff to be used in this invention can be varied over a wide range, but about 0.1–6% against the material to be dyed is suitable. The dyeing temperature should preferably be 70°–120° C., and when the dyeing is carried out at a temperature raised beyond this, there is a tendency that the amount of adsorption is decreased. In the dyeing process of this invention, the adjustment of the pH of the dyeing liquid to 3–8 gives rise to excellent dyeing effects, but when dyeing is carried out by using a dyeing liquid having the pH of more than 9 or strong acidity, the colour value is somewhat decreased.

The dyeings are treated with a wash liquid in which is incorporated soap or an equally effective surfactant, washed and dried; or reduction washing may be effected by using hydrosulphite, caustic soda and suitable surfactant. In accordance with this invention, remarkably brilliant dyeings of a polyolefinic shaped article containing a metal compound can be obtained free from a peculiar indistinctness caused by the ordinary metal complex dyestuff. It is also possible to obtain dyeings having excellent fastness to light, washing, dry cleaning, rubbing, and sublimation.

The dyestuff of the Formula I used in the process of this invention gives particularly excellent results in respect of the brightness and depth of the shade, leveling and fastness properties as compared with the dyestuff which has heretofore been used in dyeing a polyolefine shaped article containing a transition metal compound.

Even when the same diazo component as used in the production of the dyestuff of this invention is used to produce a dyestuff, the dyestuff obtained by coupling it with a coupling component different from that of the dyestuff of this invention and other coupling component do not give dyeings of high purity as shown in the below-mentioned Examples 7, 8 and 10. Also, as shown in Example 2, a dyestuff obtained by coupling a diazo component wherein the substitution at the ortho-position to the amino group is not —$SR_3$,

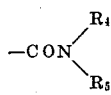

or —CN, e.g., 2-hydroxyaniline, with a coupling component of the dyestuff of this invention has a slow speed of dyeing and does not give sufficiently brilliant shades.

It is quite surprising and unexpected that a combination of the diazo and coupling components selected in accordance with this invention gives brilliant and deep shades, desirable speed of dyeing and excellent fastness properties.

The following examples explain this invention. Unless otherwise specified, the part means a part by weight. An intrinsic viscosity of the polymer is the value determined in tetralin of 135° C. The evaluation of the fastness of dyeings was conducted in accordance with the AATCC method.

Fastness to light_____(AATCC 16A—1963)
Fastness to washing_____(AATCC 36—1961—III)
Fastness to rubbing_____(AATCC 8—1961)
Fastness to dry cleaning_____(AATCC 85—1963)
Fastness to sublimation_____(AATCC 5—1957)

Example 1

0.2 g. of the dyestuff (M.P., 174–174.5° C.; N content of 12.93% found) of the formula

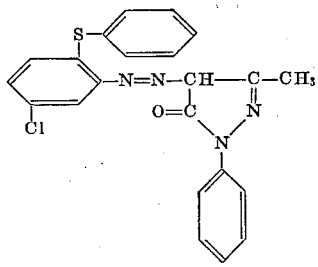

obtained by coupling diazotized 2-p-methylphenylmercapto-5-chloroaniline with 1-phenyl-3-methyl-5 - pyrazolone in a caustic soda solution were mulled with 0.2 g. of polyoxyethylene nonylphenol ether $(EO)_{10}$, dispersed in 250 cc. of water. The pH of the bath was adjusted to 4.5 with an acetic acid. In this bath was dipped 10 g. of polypropylene fibre obtained by melt-spinning at 260° C. and stretching 5× a chip which was prepared from 97 parts of isotactic polypropylene having an intrinsic viscosity of 1.60 and 3 parts of nickel stearate. The bath was heated to about 98° C. in 30 minutes. Dyeing was continued for about 60 minutes at this temperature. The dyed fibre was removed, washed with water and treated with a bath comprising 0.5 g. of hydrosulfite, 0.5 g. of caustic soda (38° Be.), 0.5 g. of polyoxyethylene nonylphenol ether $(EO)_{20}$ and 250 cc. of water. After rinsing with warm water, the dye fibre was dried. It was coloured in a brilliant yellow (lightness 39.0%; purity 79.0%; main wave length 580.5mμ) and exhibited excellent fastness to light, washing and to dry-cleaning as shown below.

TABLE I.—COLOUR VALUES

| | Lightness (percent) | Purity (percent) | Main wave length (mμ) |
|---|---|---|---|
| Original staple fibre | 39.0 | 79.0 | 580.5 |
| After washing (AATCC MC-3) | 39.2 | 79.0 | 579.7 |
| After dry-cleaning | 39.4 | 78.8 | 580.0 |
| Yarn from the fibre | 38.1 | 82.0 | 579.7 |
| After 40 hrs. irradiation in a fade-ometer (AATCC) | 36.5 | 82.5 | 580.0 |

Example 2

The dye exhaustions at 100° C., 80° C. and 60° C. were compared with one another in respect of the dyestuff of Example 1 and a dyestuff of the formula

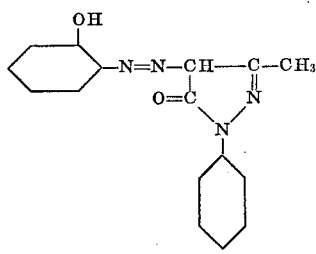

as control. The used fibre was the one described in Example 1, and a dye bath was prepared as described in Example 1. The attached figure is a graph showing the results, in which the abscissa shows a dyeing time (min.) and the ordinate shows a dye exhaustion. The curves in solid lines show the speed of dyeing, and those in dotted lines show the speed of dyeing of the control dyestuff at a specified temperature.

The figure reveals that as the dyestuff of Example 1 has a very desirable affinity as compared with the control dyestuff, it gives a desirable level dyeing.

Example 3

0.2 g. of a dyestuff (M.P. 165.0–168.5° C.; N% 16.55 found) of the formula

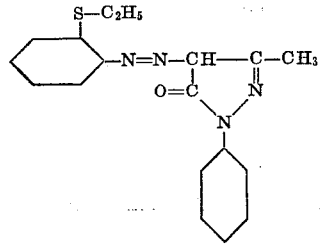

obtained by coupling diazotized 2-ethylmercaptoaniline with 1-phenyl-3-methyl-5-pyrazolone in a caustic soda solution was mulled with 0.05 g. of sodium dodecylbenzene sulfonate and 0.2 g. of sodium salt of a condensation product of 2 molar parts of naphthalene sulfonic acid with 1 molar part of formaldehyde (in the form of formalin), and dispersed in 300 cc. of water. The dye bath was placed in a super-atmospheric dyeing machine. In this bath was dipped 10 g. of polypropylene fibre obtained by melt-spinning at 240° C. and stretching 5× a chip which was prepared from 95 parts of isotactic polypropylene having an intrinsic viscosity of 1.53 and 5 parts of zinc stearate. The bath was heated to 120° C. in 20 minutes. Dyeing was continued for about 60 minutes at this temperature. The dyed fibre was treated as described in Example 1. It was coloured in a brilliant yellow and had excellent fastness to light, washing and to dry-cleaning as shown below.

TABLE II.—COLOUR VALUES

| | Lightness (percent) | Purity (percent) | Main wave length (mμ) |
|---|---|---|---|
| Original staple fibre | 46.3 | 69.0 | 577.6 |
| After washing (AATCC MC-3) | 46.1 | 68.2 | 576.9 |
| After dry-cleaning (AATCC) | 46.4 | 68.9 | 579.0 |
| Yarn from the fibre | 48.9 | 73.2 | 576.7 |
| After 40 hrs. irradiation in a fade-ometer (AATCC) | 49.0 | 70.2 | 577.2 |

Example 4

A dyestuff (M.P. 212–213° C. N% found, 1865) of the formula

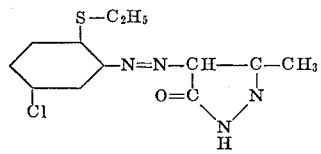

obtained by coupling diazotized 2-ethylmercapto-5-chloroaniline with 3-ethyl-5-pyrazolone was pasted with polyoxyethylene nonylphenol ether. To 8 parts of this paste (containing 15% of the dyestuff) was added 10 parts of water, and was mixed with a paste comprising 60 parts of textile gum, 8 parts of water and 14 parts of polyoxyethylene nonylphenol ether. The mixture was then stirred so as to provide a homogeneous printing paste. The said printing paste was padded to a Taffeta fabric which was woven from the yarns (75 denier/36 filament) obtained by melt-spinning at 250° C. and stretching 5× a chip which was prepared from 96.5 parts of isotactic polypropylene having an intrinsic viscosity of 1.53 and 3.5 parts of nickel naphthenate. After 30 minutes steaming at 100° C., the fabric was washed well in a 0.5% soap solution. The printed fabric was thereafter rinsed with warm water and dried. It was coloured in a bright yellow (lightness 49.2%, purity 81.6%, main wave length 578.4 mμ) and had excellent fastness as shown below.

| | Grade |
|---|---|
| Fastness to light | 8 |
| Fastness to washing | 5 |
| Fastness to rubbing | 5 |
| Fastness to sublimation | 5 |
| Fastness to dry-cleaning | 5 |

Example 5

Substantially the same procedures as described in Example 1 were repeated except that each of the indicated dyestuffs were used. The colour values and fastness of the thus obtained dyeings are shown in Table III below.

and stretching 5× a chip which was prepared from 95 parts of isotactic polypropylene having an intrinsic viscosity of 1.53 and 5 parts of nickel stearate and a fibre (Fibre B) obtained by melt-spinning at 260° C. and stretching 5× a chip which was prepared from 97 parts of isotactic polypropylene having an intrinsic viscosity of 1.60 and 3 parts of zinc stearate were dyed by each of the dyestuffs indicated in the following Table IV. In each run, 10 g. of the fibre was dipped in a dye bath prepared by mulling 0.2 g. of a dyestuff with 0.05 g. of sodium dodecylbenzene sulfonate and with 0.2 g. of a sodium salt of a condensate of 2 molar parts of naphthalene sulfonic acid with 1 molar part of formaldehyde (in the form of formalin), and dispersing the same in 300 cc. of water. The bath was heated to 98° C. in 20 minutes, and kept at this temperature for about 1 hour. The dyed fibre was after-treated is described in Example 1. The shades of the obtained dyeings are shown in Table IV.

TABLE IV

| Dyestuffs | Fiber A | Fiber B |
|---|---|---|
| 4-(2'-methylmercaptophenylazo)-1,3 dimethyl-5-pyrazolone. | Greenish yellow. | Greenish yellow. |
| 4-(2'-ethylmercaptophenylazo)-1,3 dimethyl-5-pyrazolone. | ----do-------- | Do. |
| 4-(2'-dodecylmercaptophenylazo)-1,3 dimethyl-5-pyrazolone. | Brilliant yellow. | Do. |
| 4-(2'-phylmercaptophenylazo)-1,3 dimethyl-5-pyrazolone. | Yellow-------- | Yellow. |
| 4-(2'-p-methylphenylmercaptophenyl-azo)-1,3 dimethyl-5-pyrazolone. | ----do-------- | Do. |
| 4-(2'-methylmercapto-5'-chlorophenyl-azo)1,3 dimethyl-5-pyrazolone. | Greenish yellow. | Greenish yellow. |
| 4-(2'-methylmercapto-5'-methylphenyl-azo)-1,3 dimethyl-5-pyrazolone. | ----do-------- | Do. |
| 4-(2'-methylmercaptophenylazo)-1-phenyl-3-carbethoxy-5-pyrazolone. | Yellow-------- | Do. |
| 4-(2'-ethylmercaptophenylazo)-1-phenyl-3-carbethoxy-5-pyrazolone. | ----do-------- | Do. |
| 4-(2'-dodecylmercaptophenylazo)-1-phenyl-3-carbethoxy-5-pyrazolone. | ----do-------- | Do. |
| 4-(2'-p-methylphenylmercaptophenyl-azo)-1-phenyl-3-carbethoxy-5-pyrazolone. | Yellowish brown. | Yellowish brown. |
| 4-(2'-methylmercapto-5'-chlorophenyl-azo)-1-phenyl-3-carbethoxy-5-pyrazolone. | Yellow-------- | Greenish yellow. |
| 4-(2'-methylmercapto-5'-methylphenyl-azo)-1-phenyl-3-carbethoxy-5-pyrazolone. | ----do-------- | Do. |
| 4-(2'-methylmercaptophenylazo)-3-methyl-5-pyrazolone. | Greenish yellow. | Do. |
| 4-(2'-ethylmercapto-5'-methylphenyl-azo)-3-methyl-5-pyrazolone. | Yellow-------- | Yellow. |
| 4-(2'-butylmercapto-5'-chlorophenyl-azo)-1-phenyl-3-methyl-5-pyrazolone. | Brilliant yellow. | Greenish yellow. |
| 4-(2'-butylmercapto-5'-chlorophenyl-azo)-3-methyl-5-pyrazolone. | Yellow-------- | Do. |
| 4-(2'-phenylmercaptophenylazo)-3-methyl-5-pyrazolone. | ----do-------- | Yellow. |
| 4-(2'-phenylmercapto-5'-chlorophenyl-azo)-3-methyl-5-pyrazolone. | Greenish yellow. | Greenish yellow. |
| 4-(2'-phenylmercapto-5'-methylphenyl-azo)-3-methyl-5-pyrazolone. | ----do-------- | Do. |
| 4-(2'-phenylmercapto-5'-chlorophenyl-azo)-1-phenyl-3-methyl-5-pyrazolone. | Yellow-------- | Yellow. |
| 4-(2'-ethylmercapto-5'-methoxyphenyl-azo)-3-methyl-5-pyrazolone. | Brownish yellow. | Do. |
| 4-(2'-ethylmercapto-5'-methoxyphenyl-azo)-1-phenyl-3-methyl-5-pyrazolone. | ----do-------- | Do. |
| 4-(2'-ethylmercapto-5'-bromophenyl-azo)-3-methyl-5-pyrazolone. | Greenish yellow. | Greenish yellow. |

TABLE III

| Dyestuff | Colour value ||| Fastness to— |||||
|---|---|---|---|---|---|---|---|---|
| | Lightness (percent) | Purity (percent) | Main wave length (mμ) | Light | Washing | Rubbing | Sublimation | Cleaning |
| 4-(2'-P-methylphenylmercaptophenylazo)-1-phenyl-3-methyl-5-pyrazolone | 40.9 | 76.0 | 578.4 | 5 | 5 | 5 | 5 | 4 |
| 4-(2'-dodecylmercapto-5'-chlorophenylazo)-1-phenyl-3-methyl-5-pyrazolone | 58.2 | 68.3 | 578.0 | 8 | 4 | 5 | 5 | 4 |
| 4-(2'-ethylmercapto-5-chlorophenylazo)-1-phenyl-3-methyl-5-pyrazolone | 62.7 | 47.0 | 578.6 | 7 | 5 | 5 | 5 | 5 |
| 4-(2''-methylmercaptophenylazo)-1-phenyl-3-methyl-5-pyrazolone | 59.1 | 50.8 | 578.5 | 7 | 5 | 5 | 5 | 5 |
| 4-(2'-methylmercapto-5'-chlorophenylazo)-1-phenyl-3-methyl-5-pyrazolone | 44.3 | 49.2 | 576.8 | 8 | 4 | 5 | 5 | 5 |
| 4-(2'-P-methylphenylmercapto-5'-chloro-phenylazo)-3-methyl-5-pyrazolone | 59.0 | 71.0 | 576.0 | 7 | 5 | 5 | 5 | 5 |
| 4-(2'-P-methylphenylmercaptophenylazo)-3-methyl-5-pyrazolone | 49.2 | 81.6 | 578.4 | 7 | 4 | 5 | 5 | 5 |
| 4-(2'-methylmercapto-5'-chlorophenylazo)-3-methyl-5-pyrazolone | 49.7 | 80.0 | 578.4 | 7 | 4 | 5 | 5 | 5 |
| 4-(2'-dodecylmercapto-5'-chlorophenylazo)-3-methyl-5-pyrazolone | 40.0 | 89.0 | 579.8 | 6 | 4 | 5 | 5 | 4 |

Example 6

A fibre (Fibre A) obtained by melt-spinning at 240° C.

Example 7 (Control)

The fibre material described in Example 1 was dyed substantially in accordance with the procedures described in Example 1 except that a dyestuff of the formula

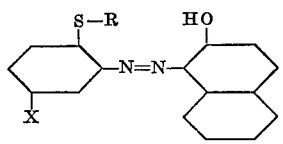

(wherein R and X are described in Table V) was used.

TABLE V

| Dyestuff | | Colour values | | |
|---|---|---|---|---|
| R | X | Lightness (percent) | Purity (percent) | Main wave length (mμ) |
| Methyl | H | 49.1 | 25.0 | 592.0 |
| Do | Cl | 51.0 | 17.0 | 600.0 |
| Ethyl | H | 31.1 | 32.5 | 596.0 |
| Do | Cl | 40.5 | 26.0 | 598.7 |
| Dodecyl | Cl | 37.8 | 28.0 | 603 |
| p-Methylphenyl | H | 23.7 | 26.8 | −492.3 |
| Do | Cl | 35.8 | 17.3 | −493.2 |

Table V reveals that these dyeings are only slightly stained.

Example 8

Procedures described in Example 1 were repeated except that 0.2 g. of a monoazo dyestuff (M.P., 208–210° C.) corresponding to the formula

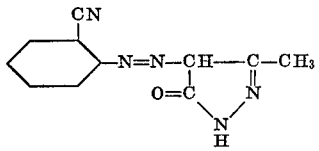

was used in place of the dyestuff of Example 1. The dyeing obtained was coloured in yellow (lightness 45.1%; purity 75.0%; main wave length 579.4 mμ), and had excellent fastness as shown below.

Fastness to light _____ 7
Fastness to washing _____ 5
Fastness to rubbing _____ 5
Fastness to sublimation _____ 5
Fastness to dry-cleaning _____ 5

The same process as described above in which 4-(2'-cyanophenylazo)-1-phenyl-3-methyl-5-pyrazolone (M.P. 205.0–206.0° C.) gave a dyeing having the following properties.

Lightness _____percent__ 52.9
Purity _____do____ 57.0
Main wave length _____mμ__ 579.0
Fastness to light _____ 6
Fastness to washing _____ 5
Fastness to rubbing _____ 5
Fastness to sublimation _____ 5
Fastness to dry-cleaning _____ 4

On the other hand, the same dyeing in which the used dyestuff is 2-cyanoaniline-β-naphthol gives only a light-coloured dyeing having a lightness of 36.3%, purity of 20.5% and a main wave length of 597.0 mμ. Furthermore, the similar dyeing obtained by means of a dyestuff obtained by coupling 2-cyanoaniline, a diazo component, with a coupling component described in Table VI gives merely a light-coloured dyeing.

TABLE VI

| Coupling Component | M.P. of dyestuff (° C.) | Dyeing | |
|---|---|---|---|
| | | Shade | Depth |
| m-N,N-dimethylaminophenol | 184–186 | Brown | Light. |
| m-N,N-diethylaminophenol | 99–102 | Orange | Do. |
| m-N-phenylaminophenol | 192–193 | do | Do. |
| p-Cresol | 131 | Pink | Do. |

Example 9

The fibre samples A and B described in Example 6 were dyed as described therein by using each of the dyestuffs indicated in the Table VII below. The shades of the obtained dyeings are shown in Table VII.

TABLE VII

| Dyestuffs | Fiber A | Fiber B |
|---|---|---|
| 4-(2'-cyano-4'-chlorophenylazo)-1-phenyl-3-methyl-5-pyrazolone. | Greenish yellow. | Greenish yellow. |
| 4-(2'-cyano-4'-methoxyphenylazo)-1-phenyl-3-methyl-5-pyrazolone. | Yellow | Do. |
| 4-(2'-cyano-4'-methoxyphenylazo)-1,3-dimethyl-5-pyrazolone. | Greenish yellow. | Green yellow. |
| 4-(2'-cyano-4'-methoxyphenylazo)-1-cyanoethyl-3-methyl-5-pyrazolone. | Yellow | Do. |
| 4-(2'-cyano-4'-methoxyphenylazo)-3-methyl-5-pyrazolone. | do | Do. |
| 4-(2'-cyano-4'-methoxyphenylazo)-1-(4''-chlorophenyl)-3-methyl-5-pyrazolone. | do | Greenish yellow. |
| 4-(2'-cyano-4'-methoxyphenylazo)-1-phenyl-3-carbethoxy-5-pyazolone. | do | Do. |
| 4-(2'-cyanophenylazo)-1-phenyl-3-carbethoxy-5-pyrazolone. | Greenish yellow. | Do. |
| 4-(2'-cyanophenylazo)-1-(4''-ethoxyphenyl)-3-carbethoxy-5-pyrazolone. | do | Yellow. |
| 4-(2'-cyanophenylazo)-1,3-dimethyl-5-pyrazolone. | Greenish yellow | Green yellow. |
| 4-(2'-cyano-4'-methylphenylazo)-1-phenyl-3-methyl-5-pyrozolone. | do | Do. |
| 4-(2'-cyano-4'-methylphenylazo)-1-(4''-chlorophenyl)-3-methyl-5-pyrazolone. | do | Do. |
| 4-(2'-cyano-4'-methylphenylazo)-3-methyl-5-pyrazolone. | do | Do. |
| 4-(2'-cyano-4'-methylphenylazo)-1,3-dimethyl-5-pyrazolone. | do | Do. |
| 4-(2'-cyano-5'-methylphenylazo)-1-(4''-ethoxyphenyl)-3-methyl-5-pyrazolone. | Yellow | Yellow. |
| 4-(2'-cyano-5'-methylphenylazo)-1-(2''-chlorophenyl)-3-methyl-5-pyrazolone. | do | Do. |
| 4-(2'-cyano-5'-methylphenylazo)-3-methyl-5-pyrazolone. | Greenish yellow. | Greenish yellow. |
| 4-(2'-cyano-5'-methylphenylazo)-1-phenyl-3-carbethoxy-5-pyrazolone. | Yellow | Do. |
| 4-(2'-cyano-5'-methylphenylazo)-1-(4''-methylphenyl)-3-methyl-5-pyrazolone. | Yellow | Yellow. |
| 4-(2'-cyano-5'-chlorophenylazo)-3-methyl-5-pyrazolone. | Greenish yellow. | Green yellow. |
| 4-(2'-cyano-5'-chlorophenylazo)-1,3-dimethyl-5-pyrazolone. | do | Do. |
| 4-(2'-cyano-5'-chlorophenylazo)-1-phenyl-3-methyl-5-pyrazolone. | do | Do. |
| 4-(2'-cyano-5'-chlorophenylazo)-1-cyanoethyl-3-methyl-5-pyrazolone. | do | Do. |
| 4-(2'-cyano-5'-chlorophenylazo)-1-phenyl-3-carbethoxy-5-pyrazolone. | Yellow | Yellow. |
| 4-(2'-cyano-5'-chlorophenylazo)-1-(4''-ethoxyphenyl)-3-carbethoxy-5-pyrazolone. | do | Do. |
| 4-(2'-cyano-5'-chlorophenylazo)-1-(4''-chlorophenyl)-3-carbethoxy-5-pyrazolone. | do | Do. |
| 4-(2'-cyano-5'-chlorophenylazo)-1-(2''-methylphenyl)-3-carbethoxy-5-pyrazolone. | do | Do. |
| 4-(2'-cyano-5'-chlorophenylazo)-1-(2''-methylphenyl)-3-methyl-5-pyrazolone. | do | Greenish yellow. |

Example 10

10 g. of Fibre A described in Example 6 was dyed by using a monoazo dyestuff (M.P., 146.5–148° C.; N content of 18.61% found and 18.56% calculated) corresponding to the formula

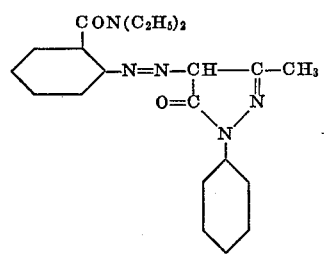

in a manner shown therein. The dyed fiber was coloured in a brilliant yellow (lightness 32.2%; purity 77.5%;

main wave length 581.3 mμ) and had an excellent AATCC fastness as shown below.

Fastness to light _____ 7
Fastness to washing _____ 5
Fastness to rubbing _____ 5
Fastness to sublimation _____ 5
Fastness to dry-cleaning _____ 5

On the other hand, even when the same dyeing as in this example is carried out by using a dyestuff made by coupling diazotized 2-N,N-diethylaminocarbonylaniline with a coupling component described in Table VIII, it is impossible to obtain a dyeing of deep colour.

TABLE VIII

| Coupling component | Shade | Depth |
|---|---|---|
| m-N,N-dimethylaminophenol | Yellow | Middle. |
| m-N,N-diethylaminophenol | do | Do. |
| p-Cresol | Orange | Light. |
| m-N-phenylaminophenol | do | Do. |
| β-Naphthol | do | Do. |

Example 11

0.3 g. of a monoazo dyestuff (M.P., 158–159° C; N content of 23.23% found and 23.24% calculated) corresponding to the formula

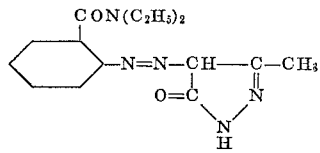

was mulled with 0.2 g. of nonylphenol polyoxyethylene ether (EO)$_{10}$. The mixture was dispersed in 250 cc. of water, and the pH of the bath was adjusted to 3.5 with an acetic acid. 10 g. of Fibre B described in Example 6 was dipped in this dye bath and was dyed in accordance with the procedures described in Example 1. The resulting dyeing was of greenish yellow (lightness 50.7%; purity 66.0%; main wave length 576.7 mμ), and had an excellent fastness as shown below.

Fastness to light _____ 6
Fastness to washing _____ 5
Fastness to rubbing _____ 5
Fastness to sublimation _____ 5
Fastness to dry-cleaning _____ 4

Example 12

The fibre samples A and B described in Example 6 were dyed by using each of the dyestuffs indicated in Table IX below in accordance with the procedures described therein. The shades of the obtained dyeings are shown in Table IX.

TABLE IX

| Dyestuffs | Fiber A | Fiber B |
|---|---|---|
| 4-(2'-N,N-diethylaminocarbonylphenylazo)-1-phenyl-3-carbethoxy-5-pyrazolone. | Yellow | Yellow. |
| 4-(2'-N,N-diethylaminocarbonylphenylazo)-3-carbethoxy-5-pyrazolone. | Greenish yellow. | Greenish yellow. |
| 4-(2'-N,N-diethylaminocarbonylphenylazo)-1,3-dimethyl-5-pyrazolone. | do | Do. |
| 4-(2'-N,N-diethylaminocarbonylphenylazo)-1-cyanoethyl-3-methyl-5-pyrazolone. | do | Do. |
| 4-(2'-N,N-diethylaminocarbonylphenylazo)-1-(4''-methylphenyl)-3-methyl-5-pyrazolone. | Yellow | Orangish yellow. |
| 4-(2'-N,N-diethylaminocarbonylphenylazo)-1-(4''-ethoxyphenyl)-3-methyl-5-pyrazolone. | do | Yellow. |
| 4-(2'-N,N-diethylaminocarbonylphenylazo)-1-(2''-methylphenyl)-3-carbethoxy-5-pyrazolone. | do | Do. |
| 4-(2'-N,N-diethylaminocarbonylphenylazo)-1-(4''-chlorophenyl)-3-carbethoxy-5-pyrazolone. | Greenish yellow. | Greenish yellow. |
| 4-(2'-N,N-diethylaminocarbonyl-4'-chlorophenylazo)-1-cyanoethyl-3-methyl-5-pyrazolone. | Yellow | Yellow. |
| 4-(2'-N,N-diethylaminocarbonyl-4'-chlorophenylazo)-1,3-dimethyl-5-pyrazolone. | do | Do. |
| 4-(2'-N,N-diethylaminocarbonyl-4'-chlorophenylazo)-1-phenyl-3-methyl-5-pyrazolone. | Orangish yellow. | Do. |
| 4-(2'-N,N-diethylaminocarbonyl-4'-chlorophenylazo)-1-phenyl-4-carbethoxy-5-pyrazolone. | do | Do. |
| 4-(2'-N,N-diethylaminocarbonyl-4'-chlorophenylazo)-1-(4''-methylphenyl)-3-methyl-5-pyrazolone. | do | Orangish yellow. |
| 4-(2'-N,N-diethylaminocarbonyl-4'-chlorophenylazo)-1-(2''-methoxyphenyl-3-methyl-5-pyrazolone. | do | Do. |
| 4-(2'-N,N-diethylaminocarbonyl-4'-chlorophenylazo)-1-(4''-ethoxyphenyl)-3-methyl-5-pyrazolone. | do | Do. |
| 4-(2'-N,N-di-n-butylaminocarbonylphenonylazo)-1-phenyl-3-methyl-5-pyrazolone. | Yellow | Greenish yellow. |
| 4-(2'-N,N-di-n-butylaminocarbonyl-4'-chloro-phenylazo)-1-phenyl-3-methyl-5-pyrazolone. | do | Do. |
| 4-(2'-N,N-di-n-butylaminocarbonyl-4'-chloro-phenylazo)-1-phenyl-3-carbethoxy-5-pyrazolone. | do | Yellow. |
| 4-(2'-N-methyl-N-phenylamino-carbonylphenylazo)-1-cyanoethyl-3-methyl-5-pyrazolone. | do | Greenish yellow. |
| 4-(2'-N-methyl-N-phenylamino-carbonylphenylazo)-1-ethyl-3-methyl-5-pyrazolone. | do | Yellow. |
| 4-2'-N-methyl-N-(4''-chlorophenyl)-aminocarbonyl-phenylazo-1-phenyl-3-carbethoxy-5-pyrazolone. | Orangish yellow. | Greenish yellow. |
| 4- 2'-N-methyl-N-(4''-chlorophenyl)-aminocarbonyl-phenylazo -1-phenyl-3-methyl-5-pyrazolone. | do | Do. |
| 4- 2'-N-methyl-N-(4''-chlorophenyl)-aminocarbonyl-phenylazo -1-(4''-chlorophenyl)-3-methyl-5-pyrazolone. | do | Do. |
| 4- 2'-N-methyl-N-(4''-chlorophenyl)-aminocarbonyl-phenylazo -1,3-dimethyl-5-pyrazolone. | Yellow | Do. |
| 4-(2'-N-ethyl-N-phenylaminocarbonyl-phenylazo)-1-phenyl-3-methyl-5-pyrazolone. | Orangish yellow. | Do. |
| 4-(2'-N-ethyl-N-phenylaminocarbonyl-phenylazo)-1-(4''-chlorophenyl)-3-methyl-5-pyrazolone. | do | Yellow. |
| 4-(2'-N-ethyl-N-phenylaminocarbonyl-phenylazo)-1,3-dimethyl-5-pyrazolone. | Yellow | Do. |

What is claimed is:

1. A process for colouring a shaped article of polymer of olefine containing a transition metal compound, characterised in that a shaped article of polymer of olefine obtained by melt shaping a polyolefinic resin wherein there is incorporated at least 0.01% by weight, based on the resin, of a transition metal compound calculated as the metal is coloured with the use of a water-insoluble mono-azo dyestuff of the formula:

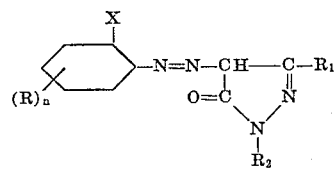

wherein X represents a member selected from the group consisting of a N,N-diloweralkylaminocarbonyl having up to 13 carbon atoms, a N,N-dimono-cyclic-vinylaminocarbonyl having up to 13 carbon atoms, a N-loweralkyl-n-mono-cyclic-arylaminocarbonyl having up to 13 carbon atoms, and a cyano; $R_1$ represents a member selected from the group consisting of a hydrogen atom, an alkyl having up to 6 carbon atoms, and an alkoxycarbonyl having up to 6 carbon atoms; $R_2$ represents a member selected from the group consisting of a hydrogen atom, an alkyl having up to 6 carbon atoms, and a mono-cyclic aryl having 6 to 10 carbon atoms; R represents a non-solubilizing member selected from the group consisting of a hydrogen atom, a halogen atom, an alkyl having up to 6 carbon atoms, an alkoxy having up to 6 carbon atoms and a cyano; and $n$ means an integer of 1 to 3.

2. The process as described in claim 1 wherein the transition metal compound is an organic acid salt of a transition metal.

3. The process as described in claim 2 wherein the transition metal compound is a carboxylic acid salt of a transition metal.

4. The process of claim 3 wherein the transition metal is nickel or zinc.

References Cited

UNITED STATES PATENTS

| | | | |
|---|---|---|---|
| 3,186,788 | 6/1965 | Mills | 8—42 |
| 3,096,140 | 7/1963 | Gaetani | 8—41 |

FOREIGN PATENTS

| | | |
|---|---|---|
| 642,346 | 5/1964 | Belgium. |
| 960,662 | 6/1964 | Great Britain. |
| 1,348,941 | 12/1963 | France. |

OTHER REFERENCES

Review of Textile Institute, 1962, vol. 14, pp. 291–292. Pub. 1963 by Textile Institute, Liverpool, England. TS 1300 R4C2.

NORMAN G. TORCHIN, *Primary Examiner.*

DONALD LEVY, *Assistant Examiner.*